US008422748B2

(12) United States Patent
Odry et al.

(10) Patent No.: US 8,422,748 B2
(45) Date of Patent: Apr. 16, 2013

(54) SYSTEM AND METHOD FOR GROUPING AIRWAYS AND ARTERIES FOR QUANTITATIVE ANALYSIS

(75) Inventors: Benjamin Odry, West New York, NJ (US); Atilla Peter Kiraly, Plainsboro, NJ (US); Carol L. Novak, Newtown, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 1988 days.

(21) Appl. No.: 11/470,294

(22) Filed: Sep. 6, 2006

(65) Prior Publication Data

US 2007/0064988 A1    Mar. 22, 2007

Related U.S. Application Data

(60) Provisional application No. 60/717,669, filed on Sep. 16, 2005.

(51) Int. Cl.
*G06K 9/00* (2006.01)
*A61B 5/08* (2006.01)

(52) U.S. Cl.
USPC .......................................... 382/128; 600/529

(58) Field of Classification Search .......... 600/529–543; 382/128–131
See application file for complete search history.

(56) References Cited

U.S. PATENT DOCUMENTS

| 6,556,696 | B1 * | 4/2003 | Summers et al. | 382/128 |
| 7,558,402 | B2 * | 7/2009 | Zhou et al. | 382/103 |
| 2006/0025674 | A1 * | 2/2006 | Kiraly et al. | 600/410 |
| 2006/0173272 | A1 * | 8/2006 | Qing et al. | 600/407 |
| 2007/0049839 | A1 * | 3/2007 | Odry et al. | 600/529 |
| 2008/0071160 | A1 * | 3/2008 | Wiemker et al. | 600/407 |

OTHER PUBLICATIONS

Automated assessment of bronchial lumen, wall thickness and bronchoarterial diameter ratio of the tracheobronchial tree using high-resolution CT; Rafael Wiemker , Thomas Blaffert, Thomas Bülow, Steffen Renisch, Cristian Lorenz; International Congress Series, vol. 1268, Jun. 2004, pp. 967-972, CARS 2004—Computer Assisted Radiology and Surgery.*

Simultaneous Segmentation and Tree Reconstruction of the Airways for Virtual Bronchoscopy; Thorsten Schlathölter, Cristian Lorenz, Ingwer C. Carlsena, Steffen Renischa, Thomas Deschamps; Medical Imaging 2002: Image Processing, Milan Sonka, J. Michael Fitzpatrick, Editors, Proceedings of SPIE vol. 4684 (2002)© 2002 SPIE o 1605-7422/02/$15.00.*

(Continued)

*Primary Examiner* — Michael Kahelin
*Assistant Examiner* — Karen Toth

(57) ABSTRACT

A method for grouping airway and artery pairs, includes: computing a two-dimensional (2D) cross-section of an airway; identifying regions of high-intensity in the 2D cross-section; computing a first indicator for each of the high intensity regions, wherein the first indicator is an orientation measure of the high intensity region with respect to the airway; computing a second indicator for each of the high intensity regions, wherein the second indicator is a circularity measure of the high intensity region; computing a third indicator for each of the high intensity regions, wherein the third indicator is a proximity measure of the high intensity region with respect to the airway; summing the first through third indicators for each of the high intensity regions to obtain a score for each of the high intensity regions; and determining which of the high intensity regions is an artery corresponding to the airway based on its score.

14 Claims, 4 Drawing Sheets

OTHER PUBLICATIONS

Automated airway evaluation system for multi-slice computed tomography using airway lumen diameter, airway wall thickness and broncho-arterial ratio; Benjamin L. Odry, Atilla P. Kiraly, Carol L. Novak, David P. Naidich, Jean-Francois Lerallut; Medical Imaging 2006: Physiology, Function, and Structure from Medical Images, edited by Armando Manduca.*

Odry B.L., Kirally A.P., Novak C.L., Naidich D.P., Lerallut J-F, "A Visualization Tool for Global Evaluation of Bronchiectasis and Local Evaluation of the Airways", European Medical & Biological Engineering Conference EMBEC'05 Proceedings; Prague, Nov. 2005.

* cited by examiner

SYSTEM AND METHOD FOR GROUPING AIRWAYS AND ARTERIES FOR QUANTITATIVE ANALYSIS

CROSS-REFERENCE TO RELATED APPLICATION

This application claims the benefit of U.S. Provisional Application No. 60/717,669, filed Sep. 16, 2005, a copy of which is herein incorporated by reference.

BACKGROUND OF THE INVENTION

1. Technical Field

The present invention relates to medical image processing, and more particularly, to a system and method for grouping airways and arteries for quantitative analysis.

2. Discussion of the Related Art

Bronchiectasis is a disorder that damages and weakens bronchial walls causing the bronchial airways to become permanently enlarged. Bronchiectasis manifests itself through changes in bronchial and arterial diameters. For example, in lungs affected by bronchiectasis the airway lumens fail to taper, whereas in healthy lungs the airway diameters become smaller with succeeding generations. Since the bronchial tree parallels the pulmonary artery and in healthy lungs an airway has approximately the same diameter as an accompanying artery, changes in the broncho-arterial ratio can be an indicator of the presence of bronchiectasis.

In order to diagnose these changes, high-resolution computed tomography (HRCT) is used to acquire patient data. For example, with HRCT it is possible to evaluate airway/artery diameters since HRCT allows the acquisition of near-isotropic data. However, it is difficult for physicians to identify an airway/artery pair that contains an unusual broncho-arterial ratio without computer assistance. Further, the large number of slices per patient in an HRCT dataset makes it difficult for physicians to evaluate the extent of bronchiectasis.

SUMMARY OF THE INVENTION

In an exemplary embodiment of the present invention, a method for grouping airway and artery pairs, comprises: computing a two-dimensional (2D) cross-section of an airway; identifying regions of high-intensity in the 2D cross-section; computing a first indicator for each of the high intensity regions, wherein the first indicator is an orientation measure of the high intensity region with respect to the airway; computing a second indicator for each of the high intensity regions, wherein the second indicator is a circularity measure of the high intensity region; computing a third indicator for each of the high intensity regions, wherein the third indicator is a proximity measure of the high intensity region with respect to the airway; summing the first through third indicators for each of the high intensity regions to obtain a score for each of the high intensity regions; and determining which of the high intensity regions is an artery corresponding to the airway based on its score.

Computing the 2D cross-section of the airway comprises: growing the airway using a three-dimensional (3D) region growing from a point within the airway to obtain a local shape of the airway; and estimating axes of the airway by computing eigenvectors of a covariance matrix of the airway. The point is user selected or automatically selected. Identifying regions of high-intensity in the 2D cross-section comprises: thresholding structures surrounding the airway; and labeling the structures surrounding the airway having high intensity.

The orientation measure is a scalar product of long axes of the airway and the high intensity region. The circularity measure is a ratio between an area of the high intensity region and a disc grown within a maximum diameter of the high intensity region. The proximity measure is a ratio between an outer diameter of the airway and a distance between a center of the airway and a center of the high intensity region.

The method further comprises segmenting the corresponding artery; and determining a broncho-arterial ratio between the airway and the corresponding artery or a broncho wall-arterial ratio between the airway and the corresponding artery. The method further comprises acquiring image data of the airway using a 3D imaging technique.

In an exemplary embodiment of the present invention, a computer program product comprises a computer useable medium having computer program logic recorded thereon for grouping airway and artery pairs, the computer program logic comprises: program code for computing a 2D cross-section of an airway; program code for identifying regions of high-intensity in the 2D cross-section; program code for computing a first indicator for each of the high intensity regions, wherein the first indicator is an orientation measure of the high intensity region with respect to the airway; program code for computing a second indicator for each of the high intensity regions, wherein the second indicator is a circularity measure of the high intensity region; program code for computing a third indicator for each of the high intensity regions, wherein the third indicator is a proximity measure of the high intensity region with respect to the airway; program code for summing the first through third indicators for each of the high intensity regions to obtain a score for each of the high intensity regions; and program code for determining which of the high intensity regions is an artery corresponding to the airway based on its score.

The program code for computing the 2D cross-section of the airway comprises: program code for growing the airway using a 3D region growing from a point within the airway to obtain a local shape of the airway; and program code for estimating axes of the airway by computing eigenvectors of a covariance matrix of the airway. The computer program product further comprises program code for selecting the point.

The program code for identifying regions of high-intensity in the 2D cross-section comprises: program code for thresholding structures surrounding the airway; and program code for labeling the structures surrounding the airway having high intensity. The computer program product further comprises: program code for segmenting the corresponding artery; and program code for determining a broncho-arterial ratio between the airway and the corresponding artery or a broncho wall-arterial ratio between the airway and the corresponding artery.

In an exemplary embodiment of the present invention, a method for selecting an artery that corresponds to an airway from structures surrounding the airway, comprises: acquiring image data of a chest; segmenting a bronchial tree from the image data of the chest; selecting an airway from the segmented bronchial tree; computing a 2D cross-section of the airway; finding structures surrounding the airway in the 2D cross-section; computing a first indicator for each of the surrounding structures, wherein the first indicator is an orientation measure of the surrounding structure with respect to the airway; computing a second indicator for each of the surrounding structures, wherein the second indicator is a circularity measure of the surrounding structure; computing a third indicator for each of the surrounding structures, wherein the third indicator is a proximity measure of the surrounding structure with respect to the airway; summing the first through third indicators for each of the surrounding structures to obtain a score for each of the surrounding structures; and determining which of the surrounding structures is an artery that corresponds to the airway based on its score, wherein a surrounding structure having a highest score is the corresponding artery.

The orientation measure is a scalar product of long axes of the airway and the surrounding structure. The circularity measure is a ratio between an area of the surrounding structure and a disc grown within a maximum diameter of the surrounding structure. The proximity measure is a ratio between an outer diameter of the airway and a distance between a center of the airway and a center of the surrounding structure.

The method further comprises: segmenting the corresponding artery; and determining a broncho-arterial ratio between the airway and the corresponding artery or a broncho wall-arterial ratio between the airway and the corresponding artery.

In an exemplary embodiment of the present invention, a system for grouping airway and artery pairs, comprises: a scanning device for acquiring image data of an airway; and an airway/artery grouping module for computing a 2D cross-section of the airway; identifying regions of high-intensity in the 2D cross-section; computing a first indicator for each of the high intensity regions, wherein the first indicator is an orientation measure of the high intensity region with respect to the airway; computing a second indicator for each of the high intensity regions, wherein the second indicator is a circularity measure of the high intensity region; computing a third indicator for each of the high intensity regions, wherein the third indicator is a proximity measure of the high intensity region with respect to the airway; summing the first through third indicators for each of the high intensity regions to obtain a score for each of the high intensity regions; and determining which of the high intensity regions is an artery corresponding to the airway based on its score.

The foregoing features are of representative embodiments and are presented to assist in understanding the invention. It should be understood that they are not intended to be considered limitations on the invention as defined by the claims, or limitations on equivalents to the claims. Therefore, this summary of features should not be considered dispositive in determining equivalents. Additional features of the invention will become apparent in the following description, from the drawings and from the claims.

DETAILED DESCRIPTION OF EXEMPLARY EMBODIMENTS

Figure 1:
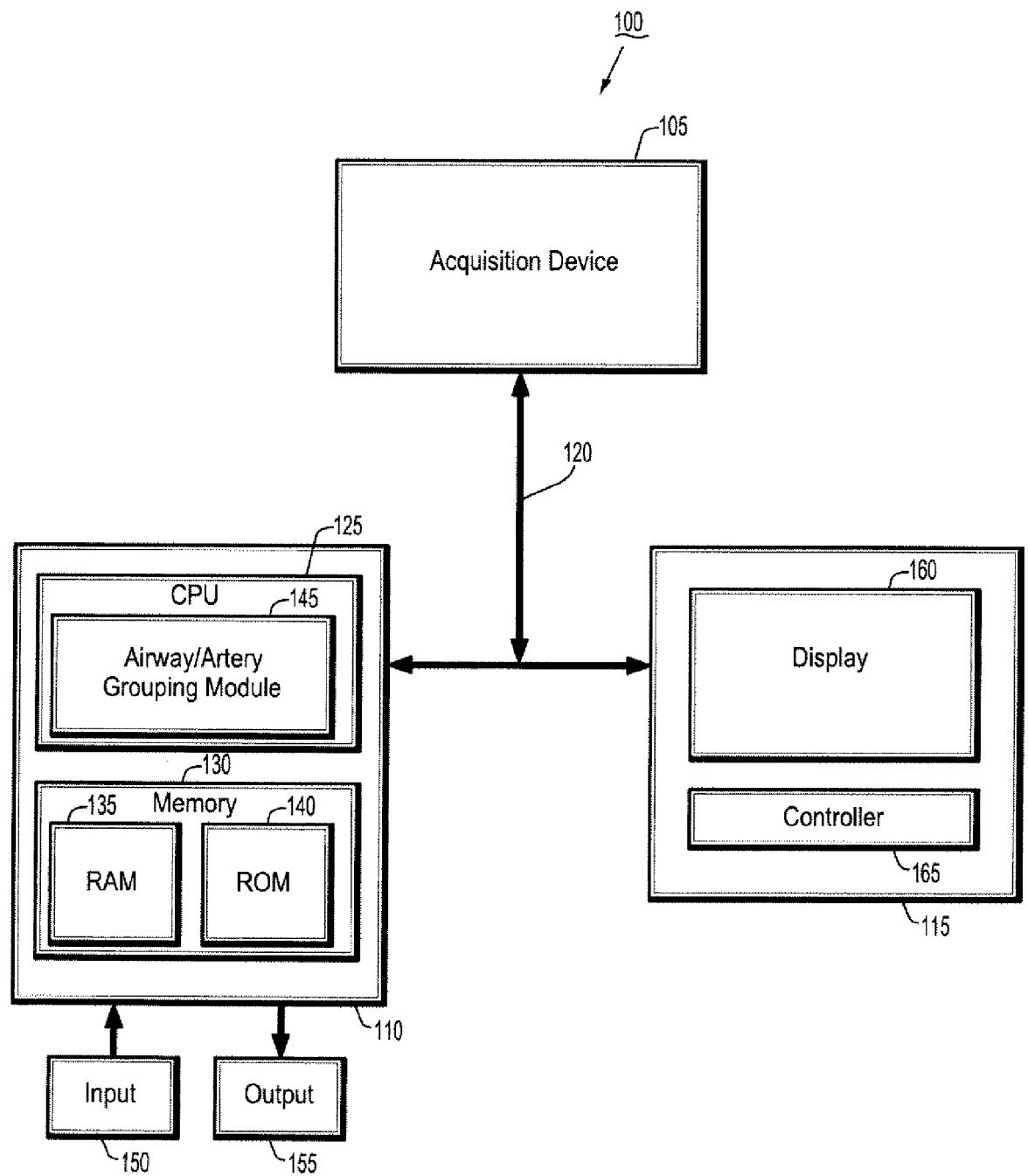
FIG. 1 is a block diagram of a system for grouping airways and arteries for quantitative analysis according to an exemplary embodiment of the present invention.

FIG. 1 is a block diagram illustrating a system 100 for grouping airways and arteries for quantitative analysis according to an exemplary embodiment of the present invention. As shown in FIG. 1, the system 100 includes an acquisition device 105, a PC 110 and an operator's console 115 connected over a wired or wireless network 120.

The acquisition device 105 may be a high-resolution computed tomography (HRCT) imaging device or any other three-dimensional (3D) high-resolution imaging device such as a magnetic resonance (MR) scanner.

The PC 110, which may be a portable or laptop computer, a medical diagnostic imaging system or a picture archiving communications system (PACS) data management station, includes a CPU 125 and a memory 130 connected to an input device 150 and an output device 155. The CPU 125 includes an airway/artery grouping module 145 that includes one or more methods for grouping airways and arteries for quantitative analysis to be discussed hereinafter with reference to FIGS. 2-4. Although shown inside the CPU 125, the airway/artery grouping module 145 can be located outside the CPU 125.

The memory 130 includes a RAM 135 and a ROM 140. The memory 130 can also include a database, disk drive, tape drive, etc., or a combination thereof. The RAM 135 functions as a data memory that stores data used during execution of a program in the CPU 125 and is used as a work area. The ROM 140 functions as a program memory for storing a program executed in the CPU 125. The input 150 is constituted by a keyboard, mouse, etc., and the output 155 is constituted by an LCD, CRT display, printer, etc.

The operation of the system 100 can be controlled from the operator's console 115, which includes a controller 165, e.g., a keyboard, and a display 160. The operator's console 115 communicates with the PC 110 and the acquisition device 105 so that image data collected by the acquisition device 105 can be rendered by the PC 110 and viewed on the display 160. The PC 110 can be configured to operate and display information provided by the acquisition device 105 absent the operator's console 115 by using, e.g., the input 150 and output 155 devices to execute certain tasks performed by the controller 165 and display 160.

The operator's console 115 may further include any suitable image rendering system/tool/application that can process digital image data of an acquired image dataset (or portion thereof) to generate and display images on the display 160. More specifically, the image rendering system may be an application that provides rendering and visualization of medical image data, and which executes on a general purpose or specific computer workstation. The PC 110 can also include the above-mentioned image rendering system/tool/application.

Figure 2:
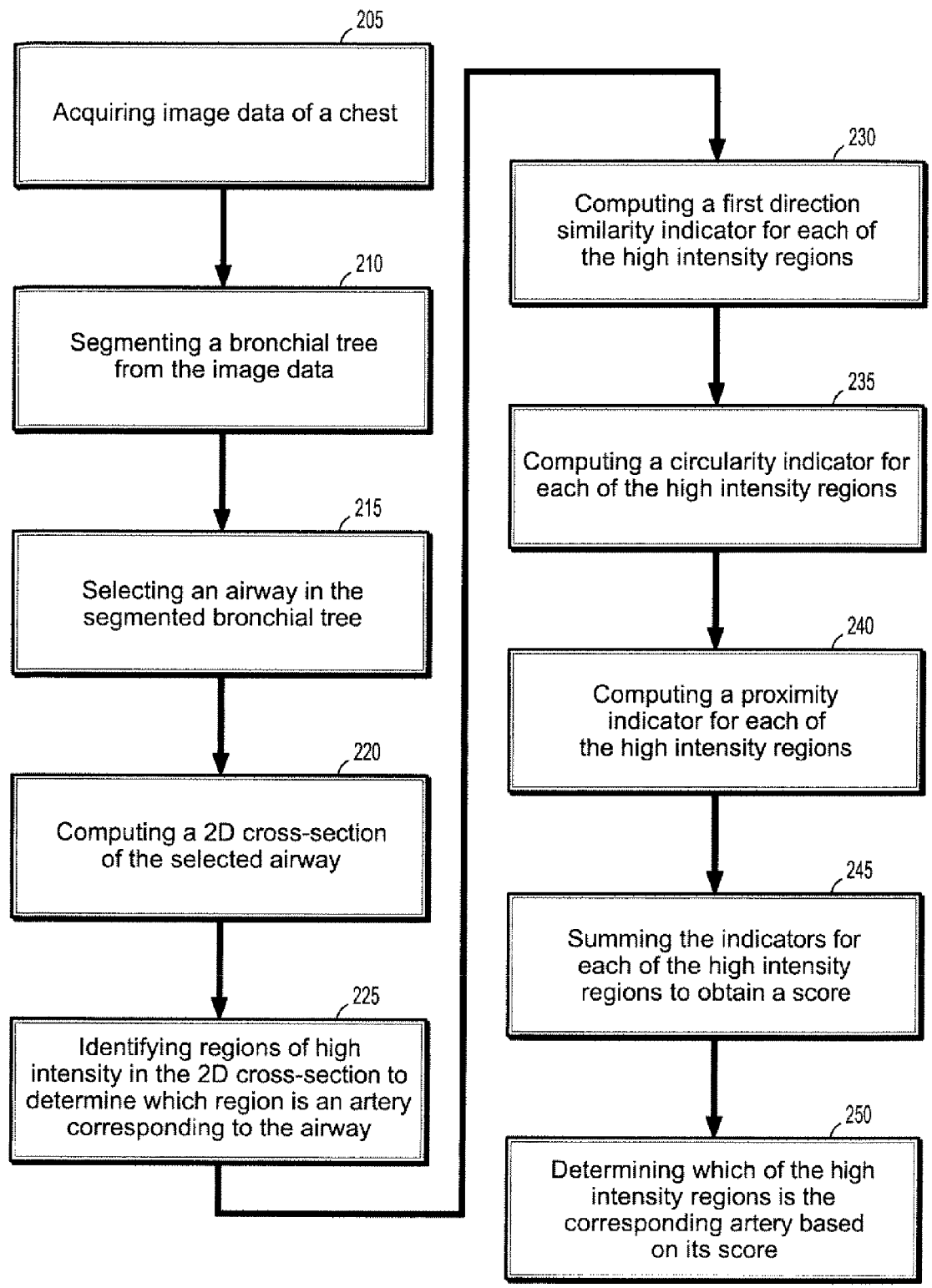
FIG. 2 is a flowchart illustrating a method for grouping airways and arteries for quantitative analysis according to an exemplary embodiment of the present invention.

FIG. 2 is a flowchart illustrating a method for grouping airways and arteries for quantitative analysis according to an exemplary embodiment of the present invention. As shown in FIG. 2, 3D image data of a bronchial tree is acquired from a patient (205). This is accomplished, e.g., by using the acquisition device 105, which is operated at the operator's console 115, to scan the patient's chest thereby generating a series of 2D image slices associated with the chest. The 2D image slices are then combined to form a 3D image of the bronchial tree.

After the 3D image data of the bronchial tree is acquired, the tree is segmented with a 3D region growing using adaptive thresholding, filtering, and leak detection (210). The region growing starts from a seed point in the trachea that is automatically determined by labeling air-like regions around the center of first slices and looking for stability in region size across the slices. Size stability is determined using a tolerance $\zeta$ on the size variation, $$S_{i+1} - S_i < \zeta,$$

with $S_i$ and $S_{i+1}$ being areas of slice i and i+1, respectively.

Once the bronchial tree is segmented, a user provides a click point within an airway to be analyzed (215). It is to be understood that the click point can be automatically chosen from a given airway tree model, thereby making the method of FIG. 2 fully automatic.

Given the user provided click point, a 2D cross-section of the selected airway is computed (220). This is done by growing the airway based on a local threshold, giving a local shape of the airway. Three principal axes of the airway are then estimated using eigenvectors of a covariance matrix of the locally segmented airway. Given its estimated axes, the 2D cross-section of the airway is determined.

Eigenvectors of the airway are computed with the covariance matrix of the airway. The covariance computation is given by:

$$R_{xy}(L) = \begin{cases} \frac{1}{N}\sum_{k=0}^{N-L-1}(x_{k+L}-\bar{x})(y_k-\bar{y}) & \text{For } L < 0 \\ \frac{1}{N}\sum_{k=0}^{N-L-1}(x_k-\bar{x})(y_{k+L}-\bar{y}) & \text{For } L \geq 0, \end{cases}$$

where L is the lag and $\bar{x}$ and $\bar{y}$ are the means of sample populations and $x=(x0, x1 \ldots xn-1)$ and $y=(y0, y1 \ldots yn-1)$. The computation of the eigenvectors is done using the Householder QL method. The covariance matrix is first reduced to a tri-diagonal form using the Householder method to fit the eigenvectors computation.

The long axis of the airway can also be determined by computing the eigenvectors of the Hessian matrix of the original data around the selected point. The Hessian matrix $H(f)$ is comprised of second-order partial derivatives of a real-valued volume $f: \Re^3 \to \Re$ of the form:

$$H(f) = \begin{bmatrix} \frac{\partial^2 f}{\partial x_1^2} & \cdots & \frac{\partial^2 f}{\partial x_1 \partial x_2} & \cdots & \frac{\partial^2 f}{\partial x_1 \partial x_3} \\ \frac{\partial^2 f}{\partial x_2 \partial x_1} & \cdots & \frac{\partial^2 f}{\partial x_2^2} & \cdots & \frac{\partial^2 f}{\partial x_2 \partial x_3} \\ \frac{\partial^2 f}{\partial x_3 \partial x_1} & \cdots & \frac{\partial^2 f}{\partial x_3 \partial x_2} & \cdots & \frac{\partial^2 f}{\partial x_3^2} \end{bmatrix}.$$

Figure 3A:
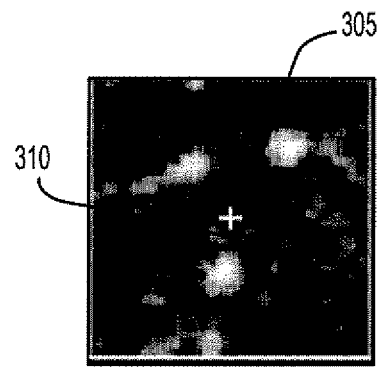
FIG. 3A is an image illustrating a two-dimensional (2D) cross-section of an airway computed according to an exemplary embodiment of the present invention.

An example of a 2D cross-section of an airway computed using the above-described method is shown in FIG. 3A. In FIG. 3A, a user selected click point 305 (indicated by a cross in the center of the image) is shown in an airway 310 (indicated by faint white edges of a circle beneath the cross).

After the 2D cross-section of the airway has been determined, regions of high intensity are identified to determine which region is an artery corresponding to the airway (225). The regions of high intensity are identified by applying a thresholding to the 2D cross-section and labeling the regions of high intensity.

Figure 3B:
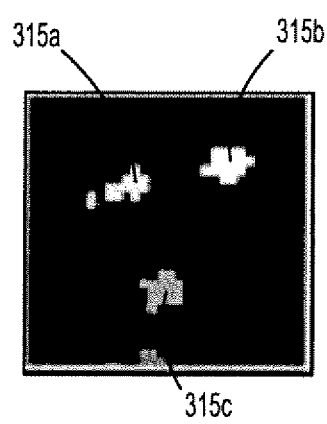
FIG. 3B is an image illustrating the 2D cross-section of the airway of FIG. 3A after applying a thresholding and labeling according to an exemplary embodiment of the present invention.

An example of the 2D cross-section of FIG. 3A after undergoing the above-described thresholding and labeling is shown in FIG. 3B. In FIG. 3B regions of high intensity 315*a-c* located around the airway 310 are shown.

Once the regions of high intensity have been identified, several measurements are taken for each of the regions to determine which of the regions is the corresponding artery.

Before taking any measurements, for each region, a center point is computed and 2D coordinates are converted into 3D coordinates in the lung volume data. A local region growing is preformed to obtain a local vessel shape and the region is processed like the airway. For example, the covariance matrix is calculated and the QL method is applied to obtain the eigenvectors of the region. The eigenvectors can also be obtained using a line-filtering operator and computed from the Hessien matrix.

The first measurement taken is a direction and similarity indicator that is used to compare the long axes from the airway and high intensity region to each other (230). The comparison is done using a scalar product between both long axes. Since the airway and its adjacent artery are generally parallel, the absolute value of this scalar product is close to 1.0. An error of about 15% can be considered when computing this scalar product to assure proper vessel selection. The scalar product is a first direction similarity indicator given by:

$$\text{similarity} = \sum_{i=0}^{2} x_i y_i,$$

with $x_i$ and $y_i$ being the long axis of the artery and airway, respectively.

Next, since the cross-section of the artery is roughly circular, a circularity operator is computed (235). The circulator operator is a ratio between an area of the high intensity region and a corresponding disc with the maximum diameter of the high intensity region. The corresponding disc is a disc that is flit to the region to see if it matches. The circularity operator is given by:

$$\text{circularity} = \frac{N}{\pi \cdot R\text{max}^2},$$

where N is the number of pixels of the high intensity region and Rmax is the maximum radius of the region.

Finally, since the corresponding artery is generally close to the airway, the proximity of the high intensity region to the airway is computed (240). This indicator is a distance ratio between the airway outer diameter and the distance between the airway and artery centers given by:

$$\text{proximity} = \frac{D_{airway}}{Dist},$$

with $D_{airway}$ being the airway outer diameter and Dist being the distance between center points of the airway and the artery.

The indicators for each of the high intensity regions are then summed and assigned a score (245). The highest score then determines which of the high intensity regions is the corresponding artery (250).

Once the corresponding artery has been determined, a precise segmentation can be realized using rays along a disc around the click point. A gradient of grayscale values of the corresponding artery can then be used to determine the length of each ray and to trace the contour of the artery.

Figure 4:
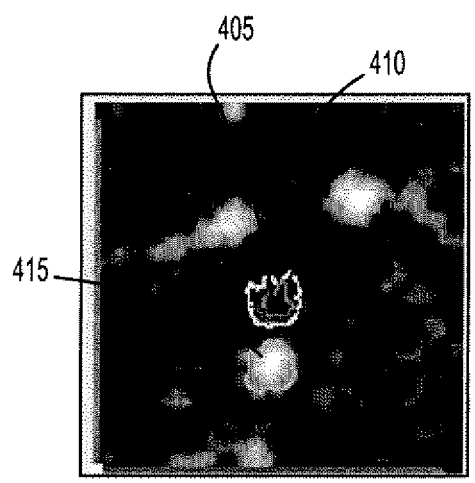
FIG. 4 is an image illustrating an artery and its corresponding airway grouped according to an exemplary embodiment of the present invention.

An example of an artery detected and segmented as just described is shown in FIG. 4. In FIG. 4, the airway's inner and outer diameters 405 and 410 are respectively shown and the artery's outer diameter 415 is shown. By using this information a broncho-arterial ratio, which is a ratio is between the inner airway diameter 405 and the artery diameter 415, and a broncho wall-arterial ratio, which is a ratio between the airway wall (e.g., outer-inner airway diameter (410-405)) and the artery diameter 415, can then be computed and used to observe airway wall dilation and airway wall thickening, respectively.

According to an exemplary embodiment of the present invention, a method for grouping airways and arteries automatically finds and segments an associated artery given an airway location. The method computes three features, orientation similarity, airway proximity and circularity to select the artery from structures surrounding the airway. The method is further adapted to measure features such as broncho-arterial or broncho wall-arterial ratios that are very useful in determining airway and arterial diseases such as bronchiectasis, emphysema, etc.

It is to be understood that although three measurements have been described in accordance with an exemplary embodiment of the present invention, other measurements may be taken or substituted with existing ones to determine the score of the surrounding structures. Further, the method for localizing the artery can also be used as a basis for arterial or airway segmentation as well as artery/vein separation.

It is to be understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a machine comprising any suitable architecture.

It is to be further understood that because some of the constituent system components and method steps depicted in the accompanying figures may be implemented in software, the actual connections between the system components (or the process steps) may differ depending on the manner in which the present invention is programmed. Given the teachings of the present invention provided herein, one of ordinary skill in the art will be able to contemplate these and similar implementations or configurations of the present invention.

It should also be understood that the above description is only representative of illustrative embodiments. For the convenience of the reader, the above description has focused on a representative sample of possible embodiments, a sample that is illustrative of the principles of the invention. The description has not attempted to exhaustively enumerate all possible variations That alternative embodiments may not have been presented for a specific portion of the invention, or that further undescribed alternatives may be available for a portion, is not to be considered a disclaimer of those alternate embodiments. Other applications and embodiments can be implemented without departing from the spirit and scope of the present invention. It is therefore intended, that the invention not be limited to the specifically described embodiments, because numerous permutations and combinations of the above and implementations involving non-inventive substitutions for the above can be created, but the invention is to be defined in accordance with the claims that follow. It can be appreciated that many of those undescribed embodiments are within the literal scope of the following claims, and that others are equivalent.

What is claimed is:

1. A method for grouping airway and artery pairs, comprising:

computing a two-dimensional (2D) cross-section of an airway;

identifying regions of high-intensity in the 2D cross-section;

computing a first indicator for each of the high intensity regions, wherein the first indicator is an orientation measure of the high intensity region with respect to the airway, wherein the orientation measure is a scalar product of long axes of the airway and the high intensity region;

computing a second indicator for each of the high intensity regions, wherein the second indicator is a circularity measure of the high intensity region;

computing a third indicator for each of the high intensity regions, wherein the third indicator is a proximity measure of the high intensity region with respect to the airway;

summing the first through third indicators for each of the high intensity regions to obtain a score for each of the high intensity regions; and determining which of the high intensity regions is an artery corresponding to the airway based on its score, wherein the first to third indicators are computed by using machine code executable by a computer processor.

2. The method of claim 1, wherein computing the 2D cross-section of the airway comprises:

growing the airway using a three-dimensional (3D) region growing from a point within the airway to obtain a local shape of the airway; and estimating axes of the airway by computing eigenvectors of a covariance matrix of the airway.

3. The method of claim 2, wherein the point is user selected or automatically selected.

4. The method of claim 1, wherein identifying regions of high-intensity in the 2D cross-section comprises:

thresholding structures surrounding the airway; and labeling the structures surrounding the airway having high intensity.

5. The method of claim 1, wherein the circularity measure is a ratio between an area of the high intensity region and a disc grown within a maximum diameter of the high intensity region.

6. The method of claim 1, wherein the proximity measure is a ratio between an outer diameter of the airway and a distance between a center of the airway and a center of the high intensity region.

7. The method of claim 1, further comprising:

segmenting the corresponding artery; and determining a broncho-arterial ratio between the airway and the corresponding artery or a broncho wall-arterial ratio between the airway and the corresponding artery.

8. The method of claim 1, further comprising:

acquiring image data of the airway using a 3D imaging technique.

9. A computer program product comprising a computer useable medium having computer program logic recorded thereon for grouping airway and artery pairs, the computer program logic comprising:

program code for computing a two-dimensional (2D) cross-section of an airway;

program code for identifying regions of high-intensity in the 2D cross-section;

program code for computing a first indicator for each of the high intensity regions, wherein the first indicator is an orientation measure of the high intensity region with respect to the airway;

program code for computing a second indicator for each of the high intensity regions, wherein the second indicator is a circularity measure of the high intensity region, wherein the circularity measure is a ratio between an area of the high intensity region and a disc grown within a maximum diameter of the high intensity region;

program code for computing a third indicator for each of the high intensity regions, wherein the third indicator is a proximity measure of the high intensity region with respect to the airway;

program code for summing the first through third indicators for each of the high intensity regions to obtain a score for each of the high intensity regions; and program code for determining which of the high intensity regions is an artery corresponding to the airway based on its score.

10. The computer program product of claim 9, wherein the program code for computing the 2D cross-section of the airway comprises:

program code for growing the airway using a three-dimensional (3D) region growing from a point within the airway to obtain a local shape of the airway; and program code for estimating axes of the airway by computing eigenvectors of a covariance matrix of the airway.

11. The computer program product of claim 10, further comprising:

program code for selecting the point.

12. The computer program product of claim 9, wherein the program code for identifying regions of high-intensity in the 2D cross-section comprises:

program code for thresholding structures surrounding the airway; and program code for labeling the structures surrounding the airway having high intensity.

13. The computer program product of claim 9, further comprising:

program code for segmenting the corresponding artery; and program code for determining a broncho-arterial ratio between the airway and the corresponding artery or a broncho wall-arterial ratio between the airway and the corresponding artery.

14. A system for grouping airway and artery pairs, comprising:

a scanning device for acquiring image data of an airway; and an airway/artery grouping module for computing a two-dimensional (2D) cross-section of the airway; identifying regions of high-intensity in the 2D cross-section; computing a first indicator for each of the high intensity regions, wherein the first indicator is an orientation measure of the high intensity region with respect to the airway; computing a second indicator for each of the high intensity regions, wherein the second indicator is a circularity measure of the high intensity region; computing a third indicator for each of the high intensity regions, wherein the third indicator is a proximity measure of the high intensity region with respect to the airway, wherein the proximity measure is a ratio between an outer diameter of the airway and a distance between a center of the airway and a center of the high intensity region; summing the first through third indicators for each of the high intensity regions to obtain a score for each of the high intensity regions; and determining which of the high intensity regions is an artery corresponding to the airway based on its score.

* * * * *